United States Patent [19]

Morikawa et al.

[11] Patent Number: 5,266,341
[45] Date of Patent: Nov. 30, 1993

[54] METHOD FOR SUPPLYING A UNIFORM STRIP OF BREAD DOUGH

[75] Inventors: Michio Morikawa; Koichi Hirabayashi, both of Utsunomiya, Japan

[73] Assignee: Rheon Automatic Machinery Co., Ltd., Utsunomiya, Japan

[21] Appl. No.: 976,154

[22] Filed: Nov. 13, 1992

[30] Foreign Application Priority Data

Dec. 5, 1991 [JP] Japan .................. 3-348864

[51] Int. Cl.$^5$ .............................................. A21D 8/00
[52] U.S. Cl. ................................ 426/231; 425/140; 426/502; 426/503; 426/517
[58] Field of Search ............ 426/231, 496, 502, 503, 426/517, 518; 425/140, 145

[56] References Cited

U.S. PATENT DOCUMENTS 4,902,524  2/1990  Morikawa et al. .................. 426/503
5,158,792  10/1992  Morikawa et al. .................. 426/503

Primary Examiner—George Yeung
Attorney, Agent, or Firm—Guy W. Shoup; Patrick T. Bever

[57] ABSTRACT

A method and apparatus for supplying a uniform strip of bread dough is provided in which a dough mass flows downward from a dough hopper, a dough portion of the flowing dough mass is laterally spread on an outlet conveyor having a weighing table, dough portions are cut and divided from the dough mass into dough pieces when a predetermined degree of the spread of the dough mass is detected by a dough-detecting device, simultaneously the weight of the dough piece is measured, the dough piece is then transferred from the outlet conveyor to a supply conveyor, the divided dough pieces are arranged on the supply conveyor at intervals proportionate to the weights of the dough pieces, and they are stretched to make a strip of bread dough. It has a uniform width and thickness, and is uniform in weight throughout the entire part of the strip of bread dough. Therefore, dough products cut and formed from this strip of bread dough are of a high quality.

1 Claim, 5 Drawing Sheets

F I G. 5
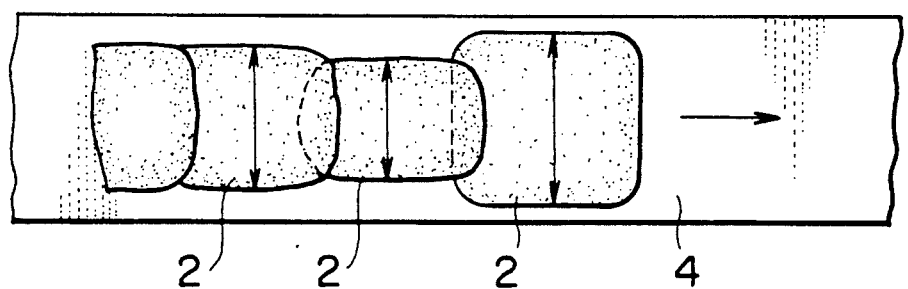

METHOD FOR SUPPLYING A UNIFORM STRIP OF BREAD DOUGH

BACKGROUND OF THE INVENTION

1. Field of the Invention

This invention relates to a method and apparatus for supplying a uniform strip of bread dough. It relates particularly to a method and apparatus by which a strip of bread dough having a uniform width and thickness is supplied. It relates more particularly to a method and apparatus for supplying a strip of bread dough that is uniform in weight. By the method and apparatus of this invention bread or confectionery products of a high quality can be obtained.

2. Prior Art

U.S. Pat. Nos. 4,902,524 and 4,883,417 disclose a method and apparatus for producing a strip of dough of substantially uniform dimensions in which a dough mass is divided into dough portions, each of the dough portions is weighed, the dough portions are arranged to be partly overlapped on a feed conveyor at intervals proportionate to the weights of the dough portions, they are stretched on the feed conveyor, and the width and thickness of a strip of stretched dough are regulated. In the prior art dough pieces obtained by dividing a dough mass flowing from the outlet of a dough hopper are of different weights, and after these dough pieces are stretched on the feed conveyor, and formed into a dough strip, the width of the strip is regulated by means of a pair of pressing boards at both sides of the feed conveyor to make the width of the strip of dough uniform. The dough pieces, however, do not have uniform weights, and have different widths. Therefore, the width of the strip of stretched dough is not uniform, unless it is regulated by means such as the pressing boards. In the prior art the dough-detecting device is not disposed. Therefore, the widths of dough pieces arranged on the conveyor at intervals proportionate to their weights are not uniform like dough pieces 2 arranged on a conveyor 4 in FIG. 5. This leads to the widths of the dough pieces not being uniform. Thus, the prior art attempted to resolve the lack of uniformity at both sides of the dough by means of the pressing boards, so as to make the widths of the dough pieces uniform. However, it has been difficult to adequately do so, because their ability to do so is limited.

If the width of the dough is made uniform by means of the pressing boards, the weight of some of the dough portions at both sides of the dough sheet increases. This results in dough products of an unstable quality. In other words, by merely measuring the weights of dough portions and proportionately arranging them, the width of a strip of dough could not be made uniform.

SUMMARY OF THE INVENTION

This invention aims to resolve the problems stated above. The widths of the dough pieces are made uniform when they are arranged on a supply conveyor. Therefore, the preparation of a dough sheet by pressing it at a downstream stage is easily achieved.

An object of this invention is to provide a method of supplying a uniform strip of bread dough having a uniform width and thickness. A strip of bread dough made by this method is uniform in width, thickness, and weight throughout the entire part of the strip of bread dough.

Another object of this invention is to provide an apparatus for supplying a uniform strip of bread dough having a uniform width, thickness, and weight.

By one aspect of this invention, a method of supplying a uniform strip of bread dough is provided, which comprises the following steps:

a) causing a dough mass to flow downward, b) cutting said flowing dough mass to divide it into dough pieces, c) measuring the weight of each said dough piece, d) serially arranging said dough pieces, at intervals proportionate to the weights of said dough pieces, and e) stretching said dough pieces to make a strip of bread dough, characterized by:

f) before said step b), causing each dough portion of said flowing dough mass to be laterally spread at the place where the weight of each said dough piece is measured, g) monitoring said dough portion that is spreading in the direction perpendicular to said strip, and h) carrying out said step b) when a predetermined degree of the spread of said dough portion is detected.

By another aspect of this invention, an apparatus for supplying a uniform strip of bread dough is provided, which comprises:

a) a dough hopper having an outlet at its bottom, b) a dough-cutting device located at the outlet of said hopper for dividing a dough mass into dough pieces, c) an outlet conveyor located under said dough-cutting device for conveying said dough pieces, said outlet conveyor having a weighing table for weighing each said dough piece, and d) a supply conveyor located under said outlet conveyor, on which said dough pieces are stretched to make a uniform strip of bread dough, characterized by:

e) a dough-detecting device located adjacent to said outlet conveyor for detecting a predetermined degree of the spread of said dough portion in the direction perpendicular to the conveying direction of said supply conveyor to thereby generate a cutting signal.

In this invention the degree of spread of the dough mass that has flowed onto the outlet conveyor is detected. Then the dough mass is cut into dough pieces having desired widths.

The dough mass from the outlet of a dough hopper flows onto the outlet conveyor under the belt of which a weighing table is located. It is then spread laterally on the outlet conveyor. The spread dough mass is detected by a dough-detecting device located adjacent to the outlet conveyor. When a predetermined degree of the spread of the dough mass is detected, the dough mass is cut and divided into dough pieces. Thus, the widths of the dough pieces are uniform, when they are arranged on a supply conveyor. Therefore, at a downstream stretching stage a strip of dough having a uniform width and thickness can be obtained.

BRIEF DESCRIPTION OF THE DRAWINGS

FIG. 5 illustrates the prior art.

PREFERRED EMBODIMENT OF THE INVENTION

Figure 1:
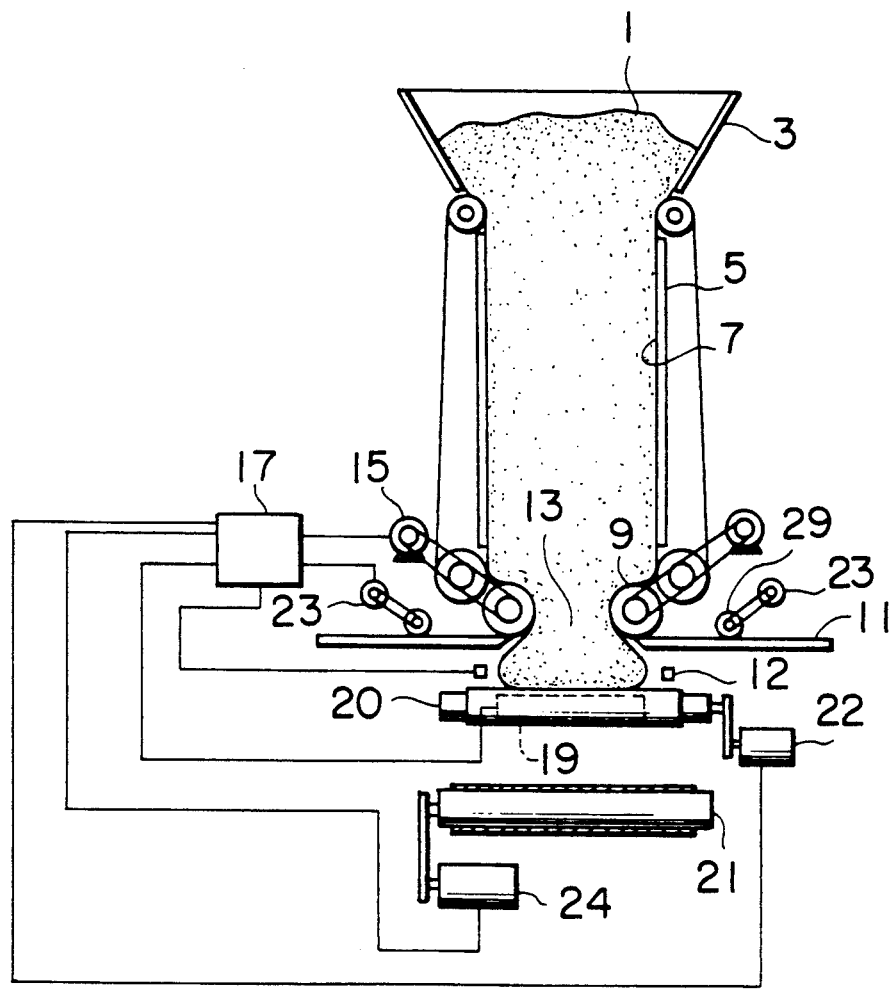
FIG. 1 is a schematic elevation view, partly in cross-section, of an embodiment of this invention.

In FIG. 1, a dough hopper 3 is to accommodate a dough mass 1. The hopper 3 is rectangular in cross-section and has four vertical walls 5. The pair of opposite vertical conveyors 7 are arranged on a pair of opposing vertical walls 5.

A pair of outlet rollers 9 are located at the bottom of the hopper 3 and define a dough outlet 13. A dough-cutting device 11 is disposed below and adjacent to the outlet rollers 9. The conveying belt of each of the vertical conveyors 7 is driven by means of a driving gear 15 through a belt entrained on a pulley connected to the shaft of the driving gear 15 and a pulley connected to the shaft of one of the driving rollers of the vertical conveyor 7. Each of the outlet rollers 9 is driven by a driving belt entrained on another pulley connected to the shaft of the vertical conveyor 7 and a pulley connected to the shaft of the outlet roller 9. Each of the conveying belts of the vertical conveyors 7 and each of the outlet rollers 9 are driven at almost the same speed, so that the dough mass 1 is continuously conveyed downward from the hopper 3 through the conveying path.

The dough-cutting device 11 has a pair of cutter-blades and they are moved horizontally to close and open the outlet 13. A rack (not shown) is mounted on each of the cutter blades. A pinion 29 that engages the rack is located on each of the cutter-blades. A driving belt is entrained on a pulley connected to the shaft of the pinion 29 and a pulley connected to the shaft of a driving gear 23. Therefore, the dough-cutting device 11 can be actuated by the driving gear 23. The driving gears 15 and 23 are both actuated by a command from a control unit 17.

An outlet conveyor 20 is located under the dough-cutting device 11. The conveying belt of the outlet conveyor 20 can receive the dough mass 1 flowing from the outlet 13 when the cutter-blades of the dough-cutting device 11 are retracted. The conveying belt of the outlet conveyor 20 is driven by a driving gear 22 through a belt entrained on a pulley connected to the shaft of the driving gear 22 and a pulley connected to the shaft of the driving roller of the outlet conveyor 20. The conveyor 20 and the driving gear 22 are adapted to be intermittently moved together, by a sliding device (not shown), in the direction opposite to the conveying direction of the outlet conveyor 20, and adapted to return to its original position. The control unit 17 calculates the timing of the intermittent rearward and forward movements of the outlet conveyor 20, and sends a signal to the sliding device to move the outlet conveyor 20 and the driving gear 22. The control unit 17 also calculates the timing of the intermittent and forward movement of the conveying belt of the outlet conveyor 20, and sends a signal to it to actuate it. Therefore, the conveying belt of the outlet conveyor 20 can transfer a dough portion received on itself to a supply conveyor 21 located under the outlet conveyor 20.

Underneath the conveying belt of the outlet conveyor 20, a weighing table 19 is located as shown by dotted lines in FIG. 1. This weighing table 19 can sense the weight of a dough portion placed on the conveying belt of the outlet conveyor 20, and sends a signal representative of the weight of the dough portion to the control unit 17.

Figure 2:
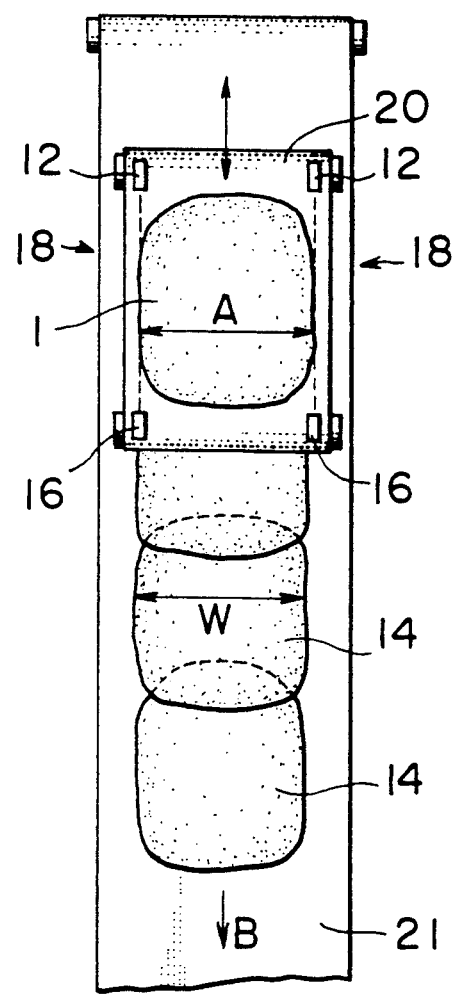
FIG. 2 is a schematic plan view of the same embodiment of this invention.

In FIG. 2 a pair of dough-detecting devices 18, namely dough-detectors, are located at two sides of the outlet conveyor 20. Each of the dough-detecting devices 18 comprises a photoelectric switch 12 (a E3R type-photoelectric switch made by OMRON Kabushiki Kaisha) and a reflector 16 (a E3R-R2E4 type-reflector made by the same Kabushiki Kaisha).

Each photoelectric switch 12 generates a beam toward a reflector 16, and the beam is reflected by it and returns to the photoelectric switch 12. If either the beam directed to the reflector 16 or the beam returning to the photoelectric switch 12 is obstructed, the switch 12 sends a cutting signal to the control unit 17. Then the unit 17 sends a command signal to the driving gear 23 to actuate it. Therefore, the cutter blades of the dough-cutting device 11 are moved to close its opening at the outlet 13. In FIG. 1 only a pair of photoelectric switches 12 can be seen at two sides of the outlet conveyor 20.

Figure 3:
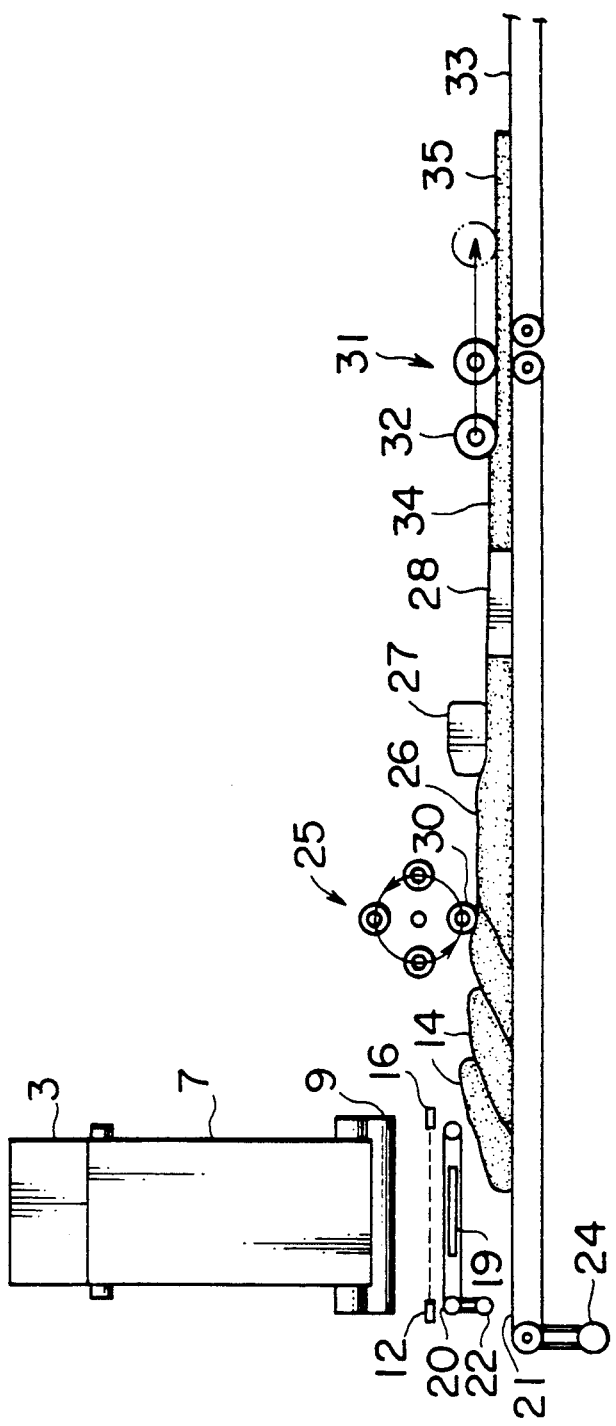
FIG. 3 is a schematic side elevation view of the same embodiment of this invention.

On the supply conveyor 21 successive steps for a strip of dough are carried out. The supply conveyor 21 is relatively long, and a conveyor 33 is located downstream of the supply conveyor 21 as shown in FIG. 3. In FIG. 1 the supply conveyor 21 is driven by means of a driving gear 24 through a driving belt entrained on a pulley mounted to the shaft of the driving roller of the supply conveyor 21 and a pulley mounted to the shaft of the driving gear 24. The supply conveyor 21 is actuated by a command signal from the control unit 17, and its conveying belt is advanced usually at a constant speed in the direction indicated by an arrow B in FIG. 2.

Figure 4:
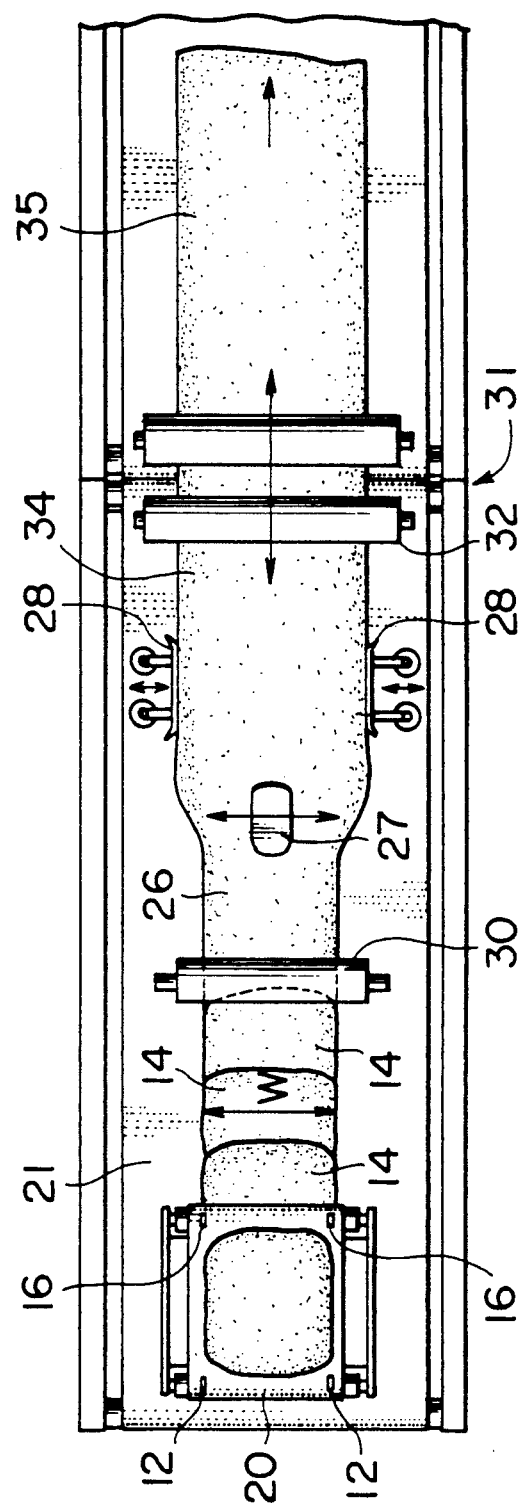
FIG. 4 is a schematic plan view of the same embodiment of this invention.

In FIGS. 3 a roller mechanism 25 is located downstream of the outlet conveyor 20. The roller mechanism 25 comprises four rollers 30 each of which is freely rotatable about its axis. They are adapted to rotate on a circular path about the center axis of the roller mechanism 25 to press partly overlapped dough pieces 14 so as to join the dough pieces 14 to each other. In FIG. 4 only one roller 30 of the roller mechanism 25 is shown. A cross roller 27 is located downstream of the roller mechanism 25. It is adapted to reciprocate laterally to roll on a strip of dough thereby spreading it in the lateral direction. A pair of pressing boards 28 are disposed at both sides of the conveyor 21 downstream of the cross roller 27. They are actuated to reciprocate in the lateral direction to give the strip of dough a certain width. A stretcher 31 is located downstream of the pressing boards 28. It comprises a plurality of rollers 32 that are horizontally and serially arranged. They are adapted to freely rotate about their axes, and are to stretch a strip of dough to give a predetermined thickness. The conveying speed of the conveyor 33 is usually somewhat higher than that of the supply conveyor 21.

The method of supplying a uniform strip of dough by this invention is now explained below.

First, the operator confirms that the outlet 13 is closed by the cutter-blades of the dough-cutting device 11. He then fills the hopper 3 with the dough mass 1, and pushes a starting button (not shown) of the control unit 17. It sends a command signal to actuate the driving gears 15. Simultaneously, the control unit 17 sends a signal to the dough-cutting device 11 so as to retract the cutter blades of it to open the outlet 13. Therefore, the dough mass 1 begins to move downward by gravity and due to the conveying action of the vertical conveyors 7. Further, the dough mass 1 flowing from the outlet 13 begins to spread on the conveying belt of the outlet conveyor 20. The distance between the pair of dough-detecting devices 18 is determined by the desired width A of a strip of dough. This symbol A is shown in FIG. 2. The lateral width of the spread dough increases slowly. The degree of this spread in the direction perpendicular to the conveying direction of the outlet conveyor 20 is detected by the dough-detecting devices 18. It sends a signal to the control unit 17. The unit 17 then sends a command signal to the driving gear 23 so as to actuate the dough-cutting device to close the opening at the outlet 13 and to cut a dough portion of the dough mass 1 to divide it into a dough piece. The control unit 17 is adapted to send a command signal to actuate the dough-cutting device 11, based on a signal from either one of the two dough-detecting devices 18. The cutter blades of the dough-cutting device 11 are advanced to cut the dough portion of the dough mass 1. Dough pieces thus produced are uniform in width. Then, these dough pieces with uniform widths are continuously transferrd to and arranged on the supply conveyor 21.

In this embodiment, although the photoelectric switches 12 and the reflector 16 were used as the dough-detecting device, it is not restricted to such a type of detector. In other words, any detector that can detect the position of the dough mass as spread may be used in this invention. The pair of dough-detecting devices 18 were located at both sides of the outlet conveyor 20. However, one dough-detecting device may be located at only one side of it to detect the spread of the dough mass. The reason is that the degree of spread of the dough mass during the dough flow is almost symmetrical at both sides. Thus, the effects of the dough-detecting device can still be attained if only one device is so disposed.

When the dough piece is placed on the outlet conveyor 20, the weighing table 19 sends a weight signal to the control unit 17. The unit 17 memorizes the weight in its memory-bank. Based on this weight memorized and a weight of a succeeding dough piece, the control unit 17 calculates intervals at which dough pieces are arranged on the supply conveyor 21. Then the control unit 17 sends a signal to the sliding device to actuate it. Therefore, the outlet conveyor 20 is moved back, and the conveying belt of it is moved forward to transfer the dough piece to the supply conveyor 21. After the outlet conveyor 20 has transferred a dough piece to the supply conveyor 21, the outlet conveyor 20 is moved forward to receive a succeeding dough piece. The succeeding dough piece is transferred from the outlet conveyor 20 to the supply conveyor 21, at calculated intervals. These intervals are such that dough pieces 14 can be partly overlapped and can form a strip of dough when they are stretched to join each other. These partly overlapped dough pieces 14 are shown in FIGS. 2 and 3. The widths (W) of the dough pieces arranged on the supply conveyor 21 are almost uniform. These dough pieces 14 are stretched by the roller mechanism 25 so as to join them to each other. Thus they become a strip of dough 26. This strip is almost uniform in width and thickness. However, to obtain a strip of dough 35 having a predetermined thickness and width, the strip 26 needs further treatment.

Therefore, the strip 26 is then spread by the cross roller 27 in the lateral direction, and its width is adjusted by the pressing boards 28, so that the strip 26 becomes a strip of dough 34. It is then stretched by the stretcher 31 and by the speed difference between the supply conveyor 21 and the conveyor 33. Therefore, a strip of dough 35 is obtained. The strip of dough 35 thus made is uniform in width, thickness, and weight throughout the entire part of the strip of bread dough.

By this invention dough pieces having a uniform width, thickness, and weight can be cut and divided from dough. This results in uniform size and weight for the divided dough pieces. Therefore, they can be arranged at regular intervals. Thus, the adhesion of the overlapped parts of the dough pieces is stable. This leads to a uniform stretching at a succeeding stretching stage.

As stated above, by this invention a strip of dough having a uniform width, thickness, and weight can be supplied to a downstream processing stage. Therefore, dough products cut and formed from this strip of dough are of a high quality. Namely, the percentage lost is none, and the dough products have a uniform size and weight.

We claim:

1. In a method of supplying a uniform strip of bread dough including the steps of:
   a) causing a dough mass to flow in a downward direction onto a weighing table,
   b) cutting said flowing dough mass into dough pieces, such that each of said dough pieces is temporarily stored on said weighing table,
   c) measuring a weight of each of said dough pieces on said weighing table,
   d) serially arranging said dough pieces on a conveyor at intervals proportionate to the weights of said dough pieces, and
   e) stretching said dough pieces to make a uniform strip of bread dough,
   wherein the improvement comprises:
   f) monitoring a lateral spread of said flowing dough mass on said weighing table before cutting said flowing dough mass into said dough pieces, and
   g) carrying out said step b) when a predetermined degree of the spread of said flowing dough mass is detected.

* * * * *